(12) United States Patent
Peichel

(10) Patent No.: US 11,602,718 B2
(45) Date of Patent: Mar. 14, 2023

(54) HIGH RECOVERY INTEGRATED UF/RO SYSTEM

(71) Applicant: BL TECHNOLOGIES, INC., Minnetonka, MN (US)

(72) Inventor: John Thomas Peichel, Minnetonka, MN (US)

(73) Assignee: BL TECHNOLOGIES, INC., Minnetonka, MN (US)

(*) Notice: Subject to any disclaimer, the term of this patent is extended or adjusted under 35 U.S.C. 154(b) by 0 days.

(21) Appl. No.: 16/498,194

(22) PCT Filed: Apr. 24, 2018

(86) PCT No.: PCT/US2018/029009
§ 371 (c)(1),
(2) Date: Sep. 26, 2019

(87) PCT Pub. No.: WO2018/200434
PCT Pub. Date: Nov. 1, 2018

(65) Prior Publication Data
US 2020/0047126 A1 Feb. 13, 2020

Related U.S. Application Data

(60) Provisional application No. 62/490,321, filed on Apr. 26, 2017.

(51) Int. Cl.
*B01D 61/58* (2006.01)
*B01D 61/02* (2006.01)
(Continued)

(52) U.S. Cl.
CPC ........... *B01D 61/58* (2013.01); *B01D 61/025* (2013.01); *B01D 61/027* (2013.01);
(Continued)

(58) Field of Classification Search
CPC .... B01D 61/58; B01D 61/025; B01D 61/027; B01D 61/145; B01D 61/147; B01D 65/02;
(Continued)

(56) References Cited

U.S. PATENT DOCUMENTS 6,702,944 B2   3/2004   Husain et al.
9,227,159 B2   1/2016   Dufresne et al.
(Continued)

FOREIGN PATENT DOCUMENTS

CN   2533123 Y   1/2003
CN   104761076 A   7/2015
(Continued)

OTHER PUBLICATIONS

International Patent Application No. PCT/US2018/029009, International Search Report and Written Opinion, dated Jun. 29, 2018.
International Patent Application No. PCT/US2018/029009, International Preliminary Reporton Patentability, dated Nov. 7, 2019.
(Continued)

*Primary Examiner* — Pranav N Patel

(57) ABSTRACT

This specification describes membrane based filtration and softening systems and methods. A system has a microfiltration or ultrafiltration (MF/UF) membrane unit upstream of a nanofiltration or reverse osmosis (NF/RO) membrane unit, optionally with no intermediate tank. In some cases, the system and method may be used with feed water provided at municipal line pressure to the membranes. NF/RO permeate is collected in a tank and then pumped to a header. Treated water may be drawn from the header for use or recycled to the system, for example to backwash or flush one or both of the membrane units. In a combined process, NF/RO permeate flushes the feed side of the NF/RO unit and then backwashes the MF/UF unit. In another process, the MF/UF
(Continued)

unit and NF/RO unit are filled with NF/RO permeate before being placed in a standby mode.

8 Claims, 1 Drawing Sheet

(51) Int. Cl.
*B01D 61/14* (2006.01)
*B01D 65/02* (2006.01)
*C02F 1/44* (2006.01)

(52) U.S. Cl.
CPC ......... *B01D 61/145* (2013.01); *B01D 61/147* (2013.01); *B01D 65/02* (2013.01); *C02F 1/441* (2013.01); *C02F 1/442* (2013.01); *C02F 1/444* (2013.01); *B01D 2311/25* (2013.01); *B01D 2313/21* (2013.01); *B01D 2313/243* (2013.01); *B01D 2313/50* (2013.01); *B01D 2317/025* (2013.01); *B01D 2317/08* (2013.01); *B01D 2321/02* (2013.01); *B01D 2321/04* (2013.01); *B01D 2321/12* (2013.01); *C02F 2303/16* (2013.01); *C02F 2307/14* (2013.01)

(58) Field of Classification Search
CPC ............ B01D 2311/25; B01D 2313/21; B01D 2313/243; B01D 2313/50; B01D 2317/025; B01D 2317/08; B01D 2321/02; B01D 2321/04; B01D 2321/12; B01D 2315/12; B01D 2317/04; B01D 2317/06; B01D 2321/14; C02F 1/441; C02F 1/442; C02F 1/444; C02F 2303/16; C02F 2307/14
See application file for complete search history.

(56) References Cited

U.S. PATENT DOCUMENTS

| | | | |
|---|---|---|---|
| 10,633,261 B1* | 4/2020 | Bondurant | C02F 1/002 |
| 2003/0127388 A1* | 7/2003 | Ando | C02F 1/441 |
| | | | 210/636 |
| 2012/0061300 A1* | 3/2012 | Matsushiro | B01D 61/58 |
| | | | 210/137 |
| 2014/0131281 A1* | 5/2014 | Morikawa | B01D 65/02 |
| | | | 210/641 |
| 2015/0375174 A1 | 12/2015 | Agnihotri | |

FOREIGN PATENT DOCUMENTS

| | | |
|---|---|---|
| EP | 1323461 A2 | 7/2003 |
| EP | 2727644 A1 | 5/2014 |
| FR | 3022901 A1 | 1/2016 |
| FR | 3023281 A1 | 1/2016 |
| WO | 9527683 A1 | 10/1995 |
| WO | 2004080577 A2 | 9/2004 |
| WO | 2015045574 A1 | 4/2015 |
| WO | 2016193855 A1 | 12/2016 |

OTHER PUBLICATIONS

European Patent Application No. 18723304.4, Communication Pursuant to Rules 161(1) and 162 EPC, dated Dec. 5, 2019.
Chinese Patent Application No. 201880027603.7, Office Action dated Jul. 15, 2021—English Translation not available.
Chinese Patent Application No. 201880027603.7, Office Action dated Jul. 15, 2021—English Translation.
European Patent Application No. 18723304.4, European Office Action dated Oct. 5, 2022.

* cited by examiner

| Mode | 49 | 46/44 | 47 | 48 | 36 | 26 | 32 | 40 | 20 |
|---|---|---|---|---|---|---|---|---|---|
| Off | C | C | n/a | O | n/a | Off | On | n/a | C |
| On | O | C | n/a | C | n/a | On | On | n/a | C |
| RO Flush | C | O | n/a | O | n/a | On | On | n/a | C |
| Clean in Place | O | C | n/a | O | n/a | On | Off | n/a | C |
| UF Flush | C | C | n/a | O | n/a | Off | On | n/a | O |

HIGH RECOVERY INTEGRATED UF/RO SYSTEM

CROSS-REFERENCE TO RELATED APPLICATIONS

This application is a National Stage Entry of International Application No. PCT/US2018/029009, filed Apr. 24, 2018, which is a non-provisional application of U.S. Application Ser. No. 62/490,321, filed Apr. 26, 2017.

FIELD

This specification relates to water softening and membrane filtration systems.

BACKGROUND

Ion exchange systems are commonly used for water softening. However, these systems consume salt, which is added to the systems to periodically regenerate the ion exchange resin. When the resin is regenerated, these systems discharge a chloride rich waste stream.

U.S. Pat. No. 6,702,944 describes an internally staged hollow fiber membrane filtration module that may optionally include nanofiltration (NF) or reverse osmosis (RO) membranes to provide water softening. In some examples, water is supplied to the module at a pressure in the range of 60-150 psi provided by a pump or municipal water supply. The internal staging and system control scheme provides a flow of feed water through the module in a single pass (without recirculation) at a minimum velocity between 0.15 and 0.6 ft/s. The module is periodically cleaned with an acid, optionally provided by injecting carbon dioxide into the module.

US Patent Application Publication Number 2015/0375174 describes a desalination system combining microfiltration (MF) or ultrafiltration (UF) membranes followed by RO membranes. Permeate from the MF/UF membranes is sent to an intermediate storage tank for feeding to the RO membranes. Concentrated water produced by the RO membranes is stored in another storage tank and used to periodically back flush the UF/MF membranes.

U.S. Pat. No. 9,227,159 describes a combined MF or UF and RO system. The MF or UF system has multiple trains of immersed membrane modules connected to a common permeate pump. The permeate pump discharges directly into the inlet of a feed pump for the RO system. A portion of the MF or UF permeate is diverted to a tank for use in backwashing the MF or UF membranes.

INTRODUCTION

This specification describes membrane based filtration and softening systems, and corresponding methods for filtering and softening water. In some cases, the system and method may be used to provide softened water, optionally using feed water provided at municipal line pressure to the membranes.

A system has a microfiltration or ultrafiltration (MF/UF) membrane unit upstream of a nanofiltration or reverse osmosis (NF/RO) membrane unit. These units are connected in series (i.e. with permeate staging) with permeate from the MF/UF unit fed to the NF/RO unit, and permeate from the NF/RO unit collected in a tank. A pump draws NF/RO permeate from the tank and supplies it under pressure to header. The header is connected to a building to supply treated water for use and also back to the system to supply NF/RO permeate for use in cleaning (i.e. flushing or backwashing) the membrane units. In one option, the system can be configured to provide a temporary flow of NF/RO permeate from the header, though the feed side of the NF/RO unit and to a portion of the MF/UF unit. In another option, the system can be configured to flush the feed and permeate sides of the MF/UF unit and the NF/RO unit with RO permeate. Where the system is installed in a building supplied with municipal water at sufficient pressure, the system can be connected to the municipal water supply without an intervening feed pump.

A method includes filtering water through an MF/UF unit and softening the filtered water in an NF/RO unit. Optionally, water is filtered and softened discontinuously, and the MF/UF and NF/RO units are filled with RO permeate while on standby between periods of filtration and softening. NF/RO permeate can be used to flush the feed side of the MF/UF unit, the NF/RO unit or both. NF/RO permeate can also or alternatively be used to backwash the MF/UF unit. In an optional combined process, NF/RO permeate flows through the feed side of the NF/RO unit and then in a reverse direction through the MF/UF unit. This combined process flushes the feed side of the NF/RO unit and backwashes the MF/UF unit with NF/RO concentrate or NF/RO permeate or both, for example as a mixture or sequentially.

DETAILED DESCRIPTION

Figures 1, 2:
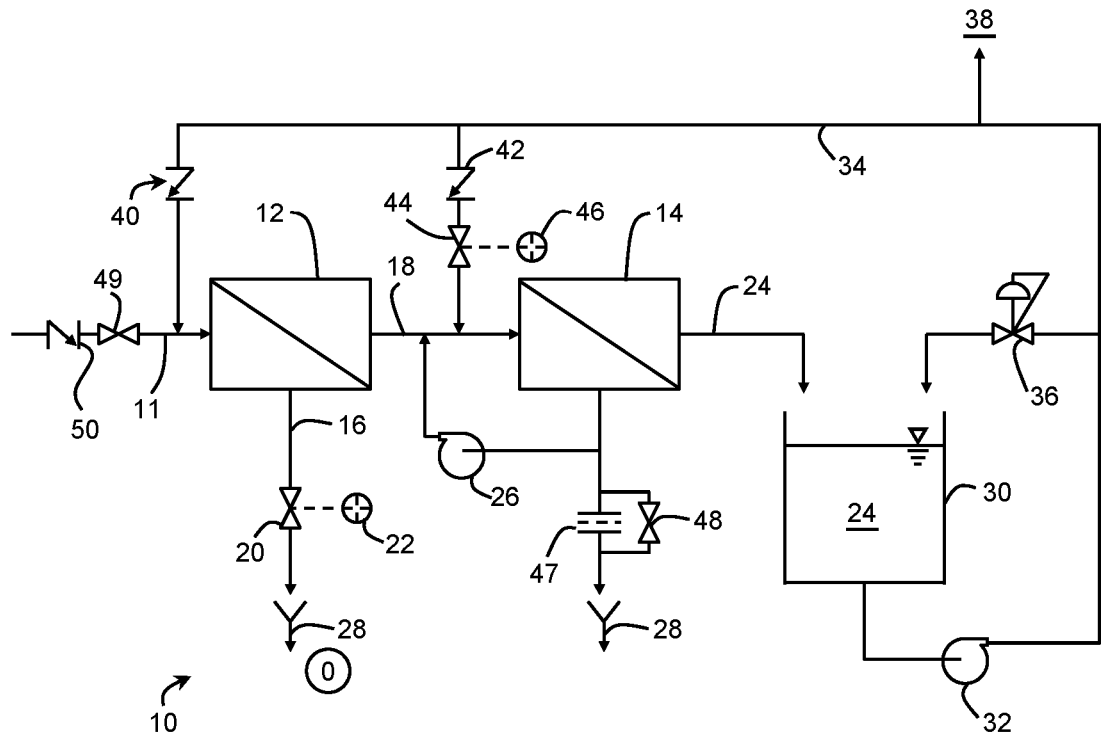
FIG. 1 is a schematic process flow diagram of a water filtration and softening system.
FIG. 2 is a chart showing alternative configurations of the system in FIG. 1 in various operating modes.

A system and method for treating water integrates an ultrafiltration (UF) or microfiltration (MF) unit with a nanofiltration (NF) or reverse osmosis (RO) unit. Each unit may have one or more membrane modules. The MF/UF unit may contain, for example, hollow fiber membranes, optionally configured for inside-out flow (feed flow into the lumens). The MF/UF membranes may be made from, for example, polyethersulfone (PES). The NF/RO unit may have, for example, ultra low energy RO membranes. The system or method may be used, for example, to soften water, for example municipal potable water supplied at pressure to a house or other building. In this application, the system or method may replace a conventional ion exchange water softener.

The MF/UF unit pretreats the water for the NF/RO unit. Optionally, municipal water is fed at line pressure through both the MF/UF unit and NF/RO unit in series. A tank is used to store NF/RO permeate, optionally without any intermediate storage of the MF/UF permeate. The NF/RO permeate is used for one or more of distribution for use, flushing the feed side of the MF/UF unit, flushing the feed side of the NF/RO unit and backwashing the MF/UF unit. In one option, the NF/RO permeate flows first through the feed side of the NF/RO unit and then in a reverse direction though the MF/UF unit. In this way, the same NF/RO permeate is used to both flush the feed side of the NF/RO unit and backwash the MF/UF unit, thereby cleaning the system while enhancing recovery relative to separately flushing the NF/RO unit and backwashing the MF/UF unit with MF/UF or NF/RO permeate directly. With the combined NF/RO flush and MF/UF backwash, NF/RO concentrate is optionally re-used to backwash the MF/UF module, but in a form that is diluted with NF/RO permeate or followed by NF/RO permeate, which inhibits scaling on the downstream side of the MF/UF unit even without adding chemicals for pH adjustment or scaling control.

Optionally, a flush of the feed side of the MF/UF unit with NF/RO permeate can be provided with (i.e. during or soon after) the MF/UF backwash or separately. In another option, NF/RO permeate flows first through the feed side of the NF/RO unit and then though the feed side of the MF/UF unit.

The system may have a single train of MF/UF and NF/RO units or multiple parallel MF/UF units or multiple parallel NF/RO units. A larger system can be arranged with parallel trains each having a certain MF/UF unit upstream of a certain NF/RO unit, or with equal or unequal numbers of MF/UF units and NF/RO units connected through a shared manifold between the MF/UF units and NF/RO units. When the amount of water to be treated justifies a larger and optionally more complex system, providing multiple trains can permit additional systems methods to improve recovery or other aspects of system operation. For example, one train can be cleaned while one or more other trains continue to produce NF/RO permeate. This can allow the relative size of a shared permeate holding tank or permeate header, or other shared components, to be reduced. Further, some or all of the water used to flush an MF/UF unit or NF/RO unit, or to backwash an MF/UF unit, can be sent to another MF/UF unit for treatment rather than to drain. Since the flushing or backwashing water includes NF/RO permeate, it may contain a low level of salts and dilute, or at least not materially concentrate, water being treated in another train. For example, at least some of the water produced while flushing an NF/RO unit or backwashing an MF/UF unit can be sent to a feed water header that distributes a shared initial supply of feed water among the trains. In this way, water produced while flushing or backwashing one train can be recovered for use as feedwater to another train.

In an exemplary system to be described in detail below, feed water is not pressurized beyond municipal line pressure. Water flows through the MF/UF units and NF/RO units in series to an open (non-pressurized) NF/RO permeate storage tank. A distribution pump pressurizes the NF/RO permeate for distribution to a building for use, and optionally for recycle to the system for flushing or backwashing as described above.

FIG. 1 shows a water treatment system 10. The system 10 has an ultrafiltration membrane unit (UF unit) 12 and a reverse osmosis unit (RO unit) 14. Optionally, the ultrafiltration unit 12 could be replaced with a microfiltration unit or a multi-stage filtration unit including an ultrafiltration or microfiltration module. In the example shown, the ultrafiltration unit 12 contains a module of PES hollow fiber ultrafiltration membranes with the separation layer on the inside of the membranes. The reverse osmosis unit 14 shown contains a spiral wound module of ultra low energy flat sheet RO membranes. Optionally, the reverse osmosis unit 14 could be replaced with a nanofiltration unit or a unit combining a nanofiltration module and a reverse osmosis module.

Feed water 11 is provided to an inlet of the UF unit 12 from a pressurized municipal water supply system. The UF unit 12 removes solids from the feed water 11 in dead end filtration to produce UF permeate 18 at a permeate outlet. Solids retained by the membranes in the UF unit 12 are discharged periodically with UF waste 16 from a retentate outlet of the UF unit 12 through a UF retentate valve 20. UF retentate valve 20 is operated by a controller which, in the example shown, is a timer 22. The controller periodically opens and closes the UF retentate valve 20 to discontinuously discharge UF waste 16 with accumulated suspended solids. The opening and closing schedule of the UF retentate valve 20 can be chosen to discharge a fraction, for example 1-10%, of the feed water 11 fed to the UF unit 12 as UF waste 16. Alternatively, UF retentate valve 20 may be opened slightly or a flow control device may be used to provide a continuous withdrawal of UF waste 16 at a fraction, for example 1-10%, of the flow rate of feed water 11 while producing UF permeate 18.

UF permeate 18 is provided to an inlet of the RO unit 14. RO unit 14 softens and further filters the UF permeate 18 to produce RO permeate 24. RO permeate 24 has reduced total dissolved solids (TDS) relative to UF permeate 18, and reduced hardness. Flow through the RO unit 14 can be dead end (i.e. without a bleed of UF permeate 18 concentrated by the RO unit 14 to drain) during filtration due to a recirculating flow of UF permeate 18 through the feed side of RO unit 14 provided by RO concentrate pump 26. Recirculating the UF permeate 18 increases the velocity of UF permeate 18 through the feed side of the RO unit 14. UF permeate 18 is recirculated through the feed side of the RO unit 14 during normal operation (i.e. filtration), optionally while flushing the feed side of the RO unit 14 and optionally during a clean-in-place (CIP) procedure. Optionally, a bleed of some solids retained in the RO unit 14 can be discharged to drain 28 while the RO unit 14 through a flow control device 47 for example a controlled valve or a fixed flow-restricting orifice. The flow control device 47 can limit the salt concentration of recirculating UF permeate 18 (alternatively called RO concentrate) on the feed side of RO unit 14 either actively, for example by measuring salt concentration and opening the flow control device 47 only while salt concentration is above a specified limit, or passively by being always open to an extent expected based on design conditions to prevent exceeding a maximum salt concentration. A bleed of UF permeate 18 may be particularly useful when treating brackish feed water. A by-pass valve 48 in a by-pass line around the flow control device 47 can be opened during flushing or clean-in-place procedures to provide a higher flow of concentrated US permeate 18 to drain 28 during these procedures.

RO permeate 24 is collected in tank 30. A distribution pump 32 draws RO permeate 24 from tank 30, pressurizes the RO permeate 24 and delivers it to header 34, shown schematically in FIG. 1 as a part of the implied conduit carrying RO permeate 24. The distribution pump 32 can be controlled with reference to a pressure sensor connected to the header 34 so as to maintain the pressure within header 34 in a selected range. Optionally, a back pressure valve 36 connecting the outlet of distribution pump 32 back to the tank 30 may be used to help control the distribution pump 32 and maintain pressure in the header 34 in the desired range.

Some of the RO permeate 24 is delivered to a building 38 from header 34. This portion of the RO permeate 24 is delivered on demand as fixtures are operated in the building 38. Optionally, a diaphragm tank may be used as the header 34 or between the header 34 and the building 38. While filtering and softening water and when the system is idle (i.e. off, or neither filtering nor cleaning), the pressure in header 34 is less than the pressure of feed water 14 and less than the pressure of UF permeate 18. When the system is idle, an inlet control valve 49 is closed and RO concentrate pump 26 is turned off. A check valve 50 can be added upstream of the inlet control valve 49.

Header 34 is connected to the inlet of UF unit 12 through UF check valve 40. When the timer 22 opens the UF retentate valve 20, RO permeate 24 (and optionally feed water 14) flows through the feed side of UF unit 12 to a drain 28 to flush the feed side of UF unit 12. This removes concentrate from the feed side of UF unit 12, which may include solids backwashed from the membranes in UF unit 12 when the feed flush is performed during or soon after a backwash of UF unit 12.

Header 34 is also connected to the inlet of RO unit 14 through a second check valve 42, controlled valve 44 and controller 46. Controller 46 in the example shown is a timer but other types of control mechanism can be used. When controlled valve 44 is open and pressure on the retentate outlet of RO unit 14 is reduced, RO permeate 24 (and optionally UF permeate 18) flows through the feed side of RO unit 14 to flush the feed side of RO unit 14. This removes concentrated water from the feed side of RO unit 14. Pressure is relatively low on the retentate outlet of the RO unit 14 by continuing to operate RO concentrate pump 26 and opening by-pass valve 48. The by-pass line including by-pass valve 48 is made of a selected diameter and length, or provided with a flow regulating orifice or other device, to provide a selected increased flow of water (relative to any flow through flow control device 47 while filtering) to drain 28 through by-pass valve 48 during flushing or clean-in-place procedures. Some RO permeate 24 continues to be produced during these procedures but at a lower rate than during filtration.

While operating in a filtration mode, RO concentrate pump 26 adds approximately as much pressure to recirculating UF permeate 18 as is lost in the RO unit 14. The pressure added by RO concentrate pump 26 is not enough to cause a backwash of UF unit 12. However, operating RO concentrate pump 26 with UF retentate valve 20 and controlled valve 44 open also causes RO concentrate (possibly mixed with RO permeate 24 to backwash the membrane of UF unit 12. Optionally, retentate valve 20 and controlled valve 44 can be left open with RO concentrate pump 26 on for an amount of time effective to replace the RO concentrate on the feed side of RO unit 14 with RO permeate 24 and further to backwash UF unit 12 with RO permeate 24, optionally after backwashing UF unit 12 with RO concentrate. In another option, RO concentrate can be flushed to drain 28 for a period of time, by opening by-pass valve 48 while turning RO concentrate pump 26 off, before turning RO concentrate pump 26 back on so that UF unit 12 is backwashed primarily or completely with RO permeate 24.

The system 10 can be operated in a cycle that changes between an operating (i.e. filtration) mode, a forward flush mode, a standby (i.e. idle or off) mode and one or more cleaning modes, for example a RO unit flush mode, a UF unit flush mode or a clean-in-place mode. In the operating mode, UF retentate valve 20 is closed (or optionally slightly open or by-passed with a flow control valve, as discussed above), controlled valve 44 is closed, by-pass valve 48 is closed and RO recirculating pump 26 is on. Feed water 11 flows under line pressure in series (i.e. with permeate staging) through the membranes of UF unit 12 and RO unit 14. RO permeate 24 is produced in tank 30. As RO permeate 24 is used and stops being used in building 38, the level of RO permeate 24 in tank 30 fluctuates. The operating mode continues while the level of RO permeate 24 in tank 30 is below a set point and the system 10 is not in a cleaning mode. For example, the operating mode may continue once started until a sensor indicates that tank 30 has been filled to a selected set point (for example water volume or water surface height) that is deemed to indicate that the tank is "full".

If the level of RO permeate 24 in tank 30 reaches the set point and the system 10 is not in a cleaning mode, the system can be put into forward flush mode and then into standby, (optionally called idle or off), mode as described further above. The system 10 stays in standby until a sensor indicates that the tank 30 has been emptied to a selected set point (for example water volume or water surface height) that is deemed to indicate the tank is at "reserve". The "reserve" set point may be selected such that the tank 30 still has sufficient water, for example water filling up to 50% of the capacity of the tank 30, available to provide permeate 24 to building 38 if demand temporarily exceeds the rate of RO permeate 24 production. In the forward flush mode, inlet control valve 49 is closed, distribution pump 32 is turned on and the system 10 is otherwise configured as in the operating mode. The forward flush mode may be maintained until RO permeate 24 fills the feed/retentate and permeate sides of the UF unit 12 and the RO unit 14. In this way, the UF unit 12 and RO unit 14 do not contain potentially scale forming concentrations of salt in still or stagnate water when they are put into standby. In at least some cases, the forward flush mode may also be sufficient to remove, or inhibit the formation of, scaling that could otherwise build up on the permeate side of the UF membranes. Scaling salts released from the permeate side of the UF membranes in the forward flush mode are rejected by the RO unit 14 and sent to drain 28. Although some RO permeate 24 is sent to drain 28 in the forward flush mode, most of the RO permeate 24 is returned to tank 30.

Periodically, for example according to a predetermined time schedule or optionally according to one or more measurements showing the condition of the system 10, the system 10 is put into a cleaning mode. Optionally, the cleaning mode proceeds only after a check indicating that there is sufficient RO permeate 24 in tank 30. The cleaning mode may involve one or more of flushing the feed side of UF unit 12, flushing the feed side of RO unit 14, backwashing the UF unit 12 with RO permeate 24 and backwashing the UF unit 12 with RO concentrate. In one option, UF concentrate valve 20 is opened, controlled valve 44 is opened, RO concentrate pump 26 is on, inlet control valve 49 is closed and by-pass valve 48 is open. This causes flushing of the feed side of UF unit 12, flushing of the feed side of RO unit 14 and backwashing the UF unit 12 first with RO concentrate and then with RO permeate 24. This process also results in the system 10 being filled with RO permeate 24 at least from the downstream side of the UF membranes to the feed side of the RO membranes. When the system changes back to an operating mode, the feed water to the RO membranes is temporarily diluted. A cleaning mode that includes backwashing the UF unit, optionally with RO permeate 24, may be provided periodically, for example for 30 to 120 seconds between 1 and 5 times a day.

In other alternatives, one or more chemicals may be injected into feed water or backwash water flowing to the MF/UF or NF/RO membranes. The chemicals may, for example, inhibit scaling or enhance removal of one or more contaminants in the feed water, for example as known in the art. In other alternatives, the MF/UF or NF/RO membranes may be periodically cleaned with one or more chemicals, for example as known in the art. However, the systems and methods describes above can optionally be used without the addition of any chemicals. Optionally, chemical cleaning can be provided once every 2 to 6 months.

In other alternatives, additional mechanical means or methods known in the art such as feed pulsing, feed flow reversal, or exposure to ultrasonic energy may be used to help inhibit fouling or clean the membranes. In other alternatives, additional tanks, pumps or other equipment may be added. However, the systems and methods described above can optionally be used without any additional mechanical means or methods to clean the membranes or inhibit fouling, and without additional tanks or pumps.

FIG. 2 shows the condition of the system in various alternative modes of operation. In a larger system, i.e. with parallel MF/UF units and/or parallel NF/RO units, water flowing through by-pass valve 48 in any of the modes may be returned to the system 10 for treatment, for example by being fed to any MF/UF unit that is not being cleaned at that time. Further, in at least some cases, one or more MF/UF and/or NF/RO units can be isolated from the system for cleaning while other units in the system are in filtration or standby mode or a different cleaning mode.

An example of a suitable membrane element for use in the UF unit 12 is the ZEEWEED™ zw700b-8060/uf10/7b/x/0.4/50 (or zw700b for brevity) ultrafiltration module available from Suez Water Technologies and Solutions. These modules use inside-out (feed water flows through the lumens of the membranes) multi-bore hollow fiber membranes made of polyethersulfone (PES). Each element has an outside diameter of 200 mm and a length of 1527 mm. These elements may be used in pressure vessels of the type normally used for spiral wound reverse osmosis modules. These elements typically operate at a trans membrane pressure of less than 1.0 bar.

An example of a suitable membrane element for use in the RO unit 14 is an ultra low energy (i.e. 75 psi (520 kPa) nominal operating pressure) RO element. One example is the OSMO™ BEV (beverage and bottled water) ULE reverse osmosis elements from Suez Water Technologies and Solutions. These elements use a thin film composite membrane.

A system 10 as in FIG. 1 was modeled using Winflows™ membrane system design software available from Suez Water Technologies and Solutions and data from the operation of zw700b and OSMO elements. The feed water 11 has a salt concentration of 500 ppm. The system 10 had a UF unit 12 made up of two parallel zw700b elements in parallel and an RO unit 14 made up of two parallel OSMO elements. The tank 30 had a "full" volume of 949 gallons and a "reserve" volume of 442 gallons. A forward flush is provided between filtration mode and standby mode. In the forward flush, 49 gallons of permeate 24 are withdrawn from tank 30 but 42 gallons of new permeate 24 are produced, causing a net consumption of 7 gallons of RO permeate 24. The system 10 remains in standby mode until users withdraw 500 gallons of water. Every third time the tank 30 is filled, instead of a forward flush the UF unit 12 is backwashed with RO permeate 24 and the feed side of the RO unit 14 is flushed with RO permeate 24, which consumes 67 gallons of RO permeate 24. The overall recovery rate of the system 10 is 81%. The inventors believe that a typical RO system would have an overall recovery under similar conditions in the range of 65-70%. The system 10 of this example provides overall high recovery while the RO unit 14 is protected by pre-treatment in the UF unit 12. Scale formation is inhibited by backwashing and by forward flushing. Without intending to be limited by theory, filling the membrane elements with low TDS, low hardness RO permeate when the system is in standby is believed to re-dissolve or weaken hardness or other types of scale that may accumulate within the system during filtration. The dissolved or suspended scale is flushed to drain upon resuming filtration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A process for treating water comprising steps of,
filtering the water through an MF/UF unit to produce a filtered water;
softening the filtered water with an NF/RO unit to produce NF/RO permeate; and,
i) flushing the MF/UF unit with the NF/RO permeate, wherein flushing the MF/UF unit comprises flushing through a feed side of the MF/UF unit, and wherein at least a portion of the NF/RO permeate used to flush the MF/UF unit is first used to flush the NF/RO unit through a feed side of the NF/RO unit, or ii) backwashing the MF/UF unit with the NF/RO permeate, wherein at least a portion of the NF/RO permeate used to backwash the MF/UF unit is first used to flush the NF/RO unit through a feed side of the NF/RO unit, or iii) filling the MF/UF unit and the NF/RO unit with the NF/RO permeate and then placing the MF/UF unit and the NF/RO unit in a standby mode.

2. The process of claim 1 wherein the process comprises ii) backwashing the MF/UF unit with the NF/RO permeate, wherein at least a portion of the NF/RO permeate used to backwash the MF/UF unit is first used to flush the NF/RO unit.

3. The process of claim 2 further comprising flushing the MF/UF unit with the NF/RO permeate, wherein flushing the MF/UF unit comprises flushing through a feed side of the MF/UF unit.

4. The process of claim 1, wherein the process comprises i) flushing the MF/UF unit with the NF/RO permeate, wherein flushing the MF/UF unit comprises flushing through a feed side of the MF/UF unit, and wherein at least a portion of the NF/RO permeate used to flush the MF/UF unit is first used to flush the NF/RO unit through a feed side of the NF/RO unit.

5. The process of claim 1, wherein the process comprises iii) filling the MF/UF unit and the NF/RO unit with the NF/RO permeate and then placing the MF/UF unit and the NF/RO unit in a standby mode.

6. The process of claim 3 wherein at least a portion of the NF/RO permeate used to flush the MF/UF unit is first used to flush the NF/RO unit.

7. The process of claim 5 wherein the step of placing the MF/UF unit and the NF/RO unit in standby comprises temporarily stopping the filtering and softening steps.

8. The process of claim 7 comprising filling the MF/UF unit and the NF/RO unit with the NF/RO permeate after stopping the filtering and softening steps and before the MF/UF unit and the NF/RO unit are placed in standby.

* * * * *